F. H. SAUER.
FILTER.
APPLICATION FILED JUNE 20, 1912.
1,045,616.
Patented Nov. 26, 1912.
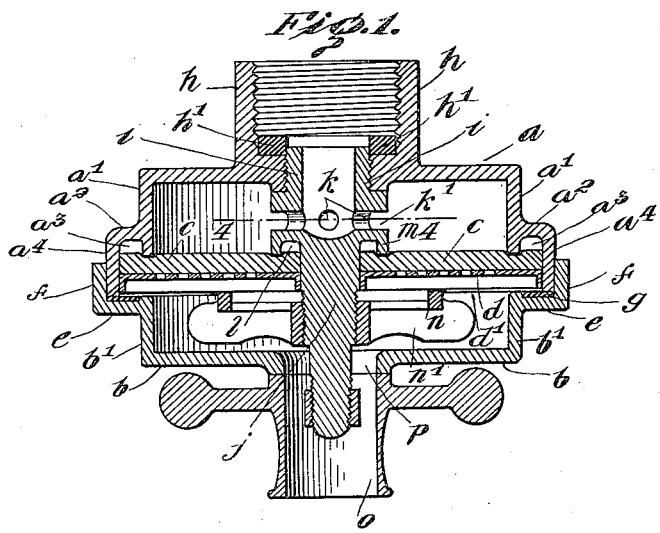
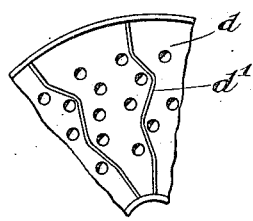
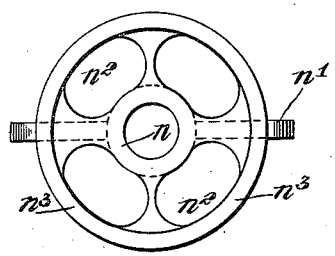
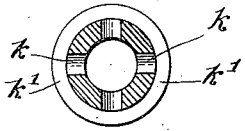
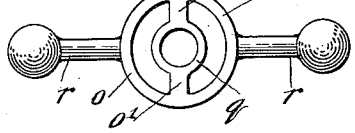
Witnesses:
J. J. Donohue
Daniel J. Dowling
Inventor
Frederick H. Sauer:
By his Attorney
Clarence S. Ashley

UNITED STATES PATENT OFFICE.

FREDERICK H. SAUER, OF NEW YORK, N. Y.

FILTER.

1,045,616.  Specification of Letters Patent. Patented Nov. 26, 1912.

Application filed June 20, 1912. Serial No. 704,703.

*To all whom it may concern:*

Be it known that I, FREDERICK H. SAUER, a citizen of the United States, and resident of the borough of Manhattan, in the city, county, and State of New York, have invented certain new and useful Improvements in Filters, of which the following is a specification.

This invention relates to filters and my improvements refer particularly to that class of filter intended for attachment to water faucets.

In brief my improvements include the following novel features, to wit: First: means whereby the filtering material is clamped in its operative position in the apparatus in manner to be perfectly secure and to prevent the leakage of fluid past the clamping edges. Second: in a filter composed of upper and lower shell portions with filtering material clamped between them, the provision of the joint between said shell portions being located on the side of reduced pressure, thereby minimizing the liability of leakage at the joint. Third: means splaying or spreading the volume of fluid being introduced to the surface of the filtering material, to distribute and thus diminish the pressure with which the filtering surface is attacked. Fourth: the novel construction and arrangement of the various parts forming my improved filtering apparatus, as will appear in the following detailed specification.

In the drawing: Figure 1 is a vertical section of my improved filter; Fig. 2 is a partial, bottom plan view of the perforated screen, with ribs thereon; Fig. 3 is a top plan view of the lock nut, with thumb wings; Fig. 4 is a section on the line 4—4 of Fig. 1, showing the delivery ports with annular splaying groove, and Fig. 5 is a bottom plan view of the outlet nozzle.

In the main my improved filter consists of an upper shell portion $a$, a lower shell portion $b$, and a disk of filtering material, such for example as felt, indicated at $c$. The filter $c$ is backed or carried by a foraminous disk or screen, as $d$, which may or may not have the ribs $d'$ on its under surface, said screen $d$ extending over a circular offset or flange $e$, which projects from the lower shell portion $b$, and has a surrounding wall $f$. The main wall $a'$ of the upper shell $a$, lies above the main wall $b'$ of lower shell $b$, and these walls $a'$, $b'$, receive between them the filter $c$ and screen $d$. The screen $d$ rests upon a lock nut $n$, to be described hereinafter, which forms a fixed support therefor and for the filter, the opposed edge of wall $a'$ becoming, under clamping pressure, firmly and deeply embedded in the yielding material of filter $c$, in a circle anterior to the perimeter of said filter. In this manner the joint effected is rendered secure against leakage because material of the filter $c$ extends both outside and inside the circle of embedment, thus forming a lock purchase or grip.

The wall $a'$ has an annular extension or flange $a^2$, with an ample clearance space $a^3$ between it and the extended portion of filter $c$, and a concentric, depending wall, as $a^4$, which incloses the peripheral edges of filter $c$ and screen $d$, and itself lies within wall $f$ of lower shell $b$, its lower edge resting upon a gasket or packing $g$ on flange $e$. The upper shell portion $a$ has a threaded throat or entrance, as $h$, for engagement with a water faucet or the like, a washer, as $h'$, in the base thereof, serving to effect a tight connection. In communication with said throat $h$, by threaded engagement with shell $a$, is the upper hollow portion $i$ of a central stem $j$, said stem penetrating central apertures in the filter $c$ and screen $d$, and depending through shell $b$. Said stem $j$ is solid below and through the filter $c$, its hollow portion $i$ terminating at a point above the filter, where it is provided with radial holes or ports $k$, extending through its wall into an external, annular groove $k'$, whose purpose is to splay, or allow the spreading of fluid issuing from ports $k$.

The stem $j$, at the point where it penetrates the filter $c$ and screen $d$, is of diminished sectional area, and, immediately above filter $c$, is provided with an undercut groove $l$, which forms a clearance above the upper surface of the filter, and also leaves a depending annular wall $m$ for circular impingement upon and embedment within the surface of the filter, to effect fluid tight connection therewith. The lower clamping device for the filter consists of the lock nut $n$, aforesaid, threaded upon stem $j$, and having thumb wings $n'$ for tightening it up. When the screen $d$ is provided with the ribs $d'$, frictional resistance to said lock nut, in turning, is thereby reduced, and furthermore said ribs leave a clearance between the screen and lock nut for fluid flow, while the lock nut itself has openings $n^2$ that the free passage of fluid may not be retarded. It will be observed that the lock nut $n$ has an annular bearing surface $n^3$ which lies beneath the screen $d$ in a circle intermediate the center and outer edge thereof, thus forming an intermediate bearing for the clamping pressures applied by the concentric walls $a'$ and $m$.

The discharge nozzle, as $o$, connects with an outlet $p$ in the base of lower shell $b$, and said nozzle carries, interiorly, by webs $o'$, a concentric collar $q$, adapted to screw upon the lower end of stem $j$. In this manner the nozzle, when screwed upon stem $j$, is secured against the outlet $p$. Also, when thus screwed up the nozzle clamps together the lower and upper shells of the casing. The nozzle may have the governor like arms $r$, by which it may be conveniently applied and removed.

Obviously, the various parts of my improved filtering apparatus may be put together and disassembled easily and expeditiously. Without skill the joint may be tightly secured, and the danger of leakage, either around the filtering material, or through the casing, is entirely avoided.

In operation, fluid entering the hollow portion $i$ of the stem, emerges from ports $k$ and groove $k'$ in form of a flaring, horizontal sheet, the initial pressure being diminished to the extent of the distribution of the fluid column prior to impingement upon the surface of the filter. On this account the filtering material is prevented from disintegrating so rapidly and its efficiency maintained for a longer period.

Particular stress is laid upon the fact that in the filter clamping means the edges of the clamping walls, both inner and outer, are embedded in the surface of the filtering material at points away from the inner and outer perimeters thereof, so that fluid cannot get past such contact points; also that the upper and lower shells of the casing have their juncture in the exit chamber where the pressure is reduced.

I claim:

1. A filter having a casing composed of upper and lower shells, a sheet of filtering material with a foraminous supporting sheet dividing said casing into reception and outlet chambers, and a stem axially penetrating said sheets; together with concentric, unrestricted clamping means for said sheets, the filter clamps being embedded in the surface of the filtering material at points anterior to the inner and outer perimeters thereof, and the concentric supporting clamp having bearing intermediate the bearing of the filter clamps.

2. A filter having a casing composed of upper and lower shells, a sheet of filtering material with a foraminous supporting sheet dividing said casing into reception and outlet chambers, and a stem axially penetrating said sheets, an under support for said sheets, the main wall of said upper shell having clamping engagement with said sheet of filtering material by embedment therein in a line anterior to its perimeter, and extension flanges of said shells having outer walls fitting together and encompassing the outer edges of said sheets.

3. A filter having a casing composed of upper and lower shells, a sheet of filtering material with a foraminous supporting sheet dividing said casing into reception and outlet chambers, a stem axially penetrating said sheets, an annular wall extending from said stem and adapted to be embedded in said filtering sheet to clamp it at a point anterior to its inner perimeter, a lock nut upon said stem to bear against said supporting sheet, and means for clamping said sheets near their outer edges.

4. A filter having a casing composed of upper and lower shells, a sheet of filtering material with a foraminous supporting sheet dividing said casing into reception and outlet chambers, a stem axially penetrating said sheets, the upper portion of said stem being hollow to receive fluid, and said stem having radial ports with an external, annular groove, to emit fluid with distributing and diminishing pressure into the reception chamber.

5. A filter having a casing composed of upper and lower shells, a sheet of filtering material and a foraminous supporting sheet dividing said casing into reception and outlet chambers, said supporting sheet having radial ribs on its under surface, a stem penetrating said sheets, and clamping means for said sheets including a lock nut, threaded on said stem and bearing concentrically against said ribs at intermediate points in their radii.

6. A filter having a casing composed of upper and lower shells, a sheet of filtering material and a foraminous supporting sheet dividing said casing into reception and outlet chambers, a stem penetrating said sheets, a removable discharge nozzle, and a threaded annulus with a web support therefor within said nozzle adapted to screw upon said stem to secure said nozzle to the stem and clamp the shells together.

Signed at the borough of Manhattan in the city, county and State of New York this 19th day of June A. D. 1912.

FREDERICK H. SAUER.

Witnesses:
F. W. BARKER,
S. R. SEMLEAR.